United States Patent [19]

Ehrend

[11] Patent Number: 5,250,625
[45] Date of Patent: Oct. 5, 1993

[54] PROCESS FOR THE CROSS-LINKING OF HALOGENATED POLYMERS

[75] Inventor: Helfried Ehrend, Speyer, Fed. Rep. of Germany

[73] Assignee: Rhein Chemie Rheinau GmbH, Mannheim

[21] Appl. No.: 686,131

[22] Filed: Apr. 16, 1991

[30] Foreign Application Priority Data

Apr. 28, 1990 [DE] Fed. Rep. of Germany ....... 4013714

[51] Int. Cl.$^5$ .................... C08L 37/00; C08L 39/00
[52] U.S. Cl. .................................. 525/182; 525/178; 525/184
[58] Field of Search ............................. 525/184, 182

[56] References Cited

FOREIGN PATENT DOCUMENTS 0336735 3/1989 European Pat. Off. .
2356687 11/1978 France .

Primary Examiner—Ana L. Carrillo
Attorney, Agent, or Firm—Connolly & Hutz

[57] ABSTRACT

The cross-linking of halogenated polymers such as chlorinated polyethylene with bis-(2,5-dimercapto-1,3,4-thiadiazole) in the presence of a basic substance may easily be carried out and leads to improved properties of the vulcanisate, in particular when amidamines such as, for example, tetraethylene pentamine distearate are used as basic substances.

16 Claims, No Drawings

PROCESS FOR THE CROSS-LINKING OF HALOGENATED POLYMERS

This invention relates to a process for the cross-linking of halogenated polymers such as chlorinated polyethylene by means of bis-(2,5-dimercapto-1,3,4-thiadiazole), hereinafter referred to as BDTD, or bis-(2,5-dimercapto-1,3,4-thiadiazole) derivatives such as the monobenzoyl derivative and basic substances, in particular certain amidamines.

It is known from German Offenlegungsschriften Nos. 2 754 060 and 2 845 125 to cross-link saturated, halogenated polymers by heating them in the presence of 2,5-dimercapto-1,3,4-thiadiazole and a basic material. The basic material used is in particular a combination of an organic base and an inorganic base, the organic base used being an amine having a boiling point above circa 110° C. and a pK-value below circa 4.5. Dicyclohexylamine and a reaction product of aniline and butyraldehyde are mentioned as preferred amines for this purpose.

These amines are difficult to handle as they are powerfully corrosive organic liquids and are difficult to incorporate in rubber mixtures.

Further, when these amines are used for the cross-linking of chlorinated polyethylene, the vulcanizate properties are found to be unsatisfactory and the moulds used for the production of the articles are found to be badly soiled and the articles are difficult to remove from the mould.

The present invention relates to a process for the cross-linking of halogenated polymers such as chlorinated polyethylene with bis-(2,5-dimercapto-1,3,4-thiadiazole) or derivatives thereof in the presence of a basic material. The basic material is preferably an amidamine corresponding to the following formula

$$R-CO-NH-[CH_2-CH_2-NH]_n-CO-R_1 \quad (I)$$

wherein

R stands for saturated or unsaturated hydrocarbon group having 6 to 22 carbon atoms, $R_1$ stands for alkyl, aryl, cycloalkyl, aralkyl or R—COCH$_2$-CH$_2$ and n stands for an integer from 1 to 10.

The alkyl group may be straight chained or branched and may in particular have 1 to 18 carbon atoms. The aryl group preferably has 6 to 12 carbon atoms and may carry substituents such as halogen, $C_1$-$C_4$-alkyl, nitro, cyano or $C_1$-$C_4$-alkoxy; the cycloalkyl group preferably has 5 to 8 carbon atoms; the aralkyl in particular has 7 to 12 carbon atoms and its aryl moiety may carry the same substituents as the above-mentioned aryl group.

Preferred compounds of formula I correspond to formula II

$$R_2-CO-NH-[CH_2-CH_2-NH]_m-CO-R_3 \quad (II)$$

wherein $R_2$ and $R_3$ may be identical or different and stand for straight chained, saturated alkyl with 8 to 18 carbon atoms and m stands for an integer from 2 to 5.

The compounds of formulae I and II are generally solid, non-corrosive substances which can easily be incorporated in rubber mixtures.

The amidamine is preferably used in a quantity of from 1 to 5% by weight, in particular from 2 to 4.5% by weight, based on the rubber. BDTD is preferably used in a quantity of from 1 to 4% by weight, in particular from 2 to 3% by weight, based on the rubber.

The invention further relates to the use of bis-(2,5-dithio-1,3,4-thiadiazole) as cross-linking agent for halogenated polymers.

For information on the properties and fields of application of chlorinated polyethylene, known as CM according to ASTM-D 1418, see E.Rohde, Kautschuk + Gummi, Kunststoffe 35, 1982, pages 478 et seq).

The halogenated polymer used may be CM, i.e. a chlorinated polyethylene with a chlorine content of about 25 to 45% by weight prepared by suspension chlorination of low pressure polyethylene.

Other halogenated elastomers, such as CSM, CO/ECO, CR and CIIR, may be halogenated with BDTD in the same manner.

EXAMPLE 1

Demonstrates the influence of increasing quantities of amidamine on the activation of cross-linking of a CM mixture with BDTD. No true cross-linking takes place without the addition of amidamine. An optimum cross-linking characterstic is in most cases obtained with 3 to 4.5 phr of amidamine. Sufficiently long initial vulcanization times (T 10) and a short final vulcanization time (T 90) are obtained.

|  | A | D | E | F |
| --- | --- | --- | --- | --- |
| CM | 100 |  |  |  |
| MgO | 10 |  |  |  |
| Carbon black | 50 |  |  |  |
| Kaolin | 60 |  |  |  |
| Alkyl sulphonic acid ester | 20 |  |  |  |
| Aromatic mineral oil | 20 |  |  |  |
| BDTD | 2.5 |  |  |  |
| Amidamine | — | 1.5 | 3.0 | 4.5 |
| Elastograph at 180° C. |  |  |  |  |
| F min (Nm) | 0.051 | 0.046 | 0.032 | 0.031 |
| F max (Nm) | 0.246 | 0.334 | 0.491 | 0.568 |
| T 10 (min) | 0.70 | 1.00 | 1.40 | 1.40 |
| T 50 (min) | 2.70 | 6.30 | 4.90 | 3.30 |
| T 90 (min) | 16.70 | 18.20 | 13.60 | 9.20 |

EXAMPLE 2

Demonstrates a comparison between the above-mentioned activation by powerfully corrosive liquids such as an aniline-condensation product and the cyclohexylamine, the optimum dose of which is about 1.5 phr. By comparison, the amidamine which has a substantially higher molecular weight must also be added in higher doses (see Example 1).

A more reliable initial vulcanization (T 10) with more rapid final vulcanization (T 90) is obtained with amidamine in spite of the considerably higher dosage. In addition, the viscosity of the mixture is lowered by the amidamine, whereby extrusion is facilitated and more advantageous properties are obtained for IM processing. The vulcanizate values of the mixture with amidamine are distinguished by their exceptionally good elongations at break. This advantage is also found after testing of the ageing in hot air.

|  | B | C | F |
| --- | --- | --- | --- |
| CM | 100 |  |  |
| MgO | 10 |  |  |
| Carbon black N-550 | 50 |  |  |

-continued

|  | B | C | F |
|---|---|---|---|
| Kaolin | 60 | | |
| Alkyl sulphonic acid ester | 20 | | |
| Aromatic mineral oil | 20 | | |
| BDTD | 2.5 | | |
| Aniline condensation product | 1.5 | — | — |
| Cyclohexylamine | — | 1.5 | |
| Amidamine | — | — | 4.5 |
| Elastograph at 180° C. | | | |
| F min (Nm) | 0.047 | 0.049 | 0.031 |
| F max (Nm) | 0.483 | 0.581 | 0.568 |
| T 10 (min) | 0.80 | 0.90 | 1.40 |
| T 50 (min) | 3.30 | 2.70 | 3.30 |
| T 90 (min) | 15.70 | 12.60 | 9.20 |
| Viscosity of mixture: | | | |
| ML 1 + 4/100° C. | 36 | 36 | 30 |
| Vulcanization 30 min/170° C.: | | | |
| Hardness (ShA) | 82 | 82 | 83 |
| Elasticity (%) | 13 | 13 | 13 |
| $\sigma$100 (MPa) | 6.7 | 8.0 | 5.3 |
| $\sigma$300 (MPa) | — | — | 8.0 |
| Tensile strength (MPa) | 7.2 | 8.1 | 8.1 |
| Elongation at break (%) | 190 | 190 | 305 |
| Hot air ageing 7d/125° C.: | B | C | F |
| Hardness (ShA) | 86 | 86 | 88 |
| Elasticity (%) | 13 | 13 | 13 |
| Tensile strength (MPa) | 10.2 | 11.4 | 9.8 |
| Elongation at break (%) | 95 | 85 | 160 |

EXAMPLE 3

Demonstrates the cross-linking of chlorinated polyethylene (CM) with increasing quantities of BDTD. In the present mixture, the optimum dose is about 2.0 parts by weight. For other formulations, doses of 0.5 to 4.5 parts by weight may be used and are customary.

| (Example 1) | A | B | C | D |
|---|---|---|---|---|
| CM | 100 | 100 | 100 | 100 |
| MgO | 10 | 10 | 10 | 10 |
| Carbon black N-550 | 70 | 70 | 70 | 70 |
| HA mineral oil | 30 | 30 | 30 | 30 |
| Ester plasticizer | 10 | 10 | 10 | 10 |
| Amidamine activator | 3.5 | 3.5 | 3.5 | 3.5 |
| BDTD | 1.0 | 1.5 | 2.0 | 2.5 |
| Vulcanization 20 min/170° C. | | | | |
| Hardness (ShA) | 77 | 80 | 82 | 82 |
| Elasticity (%) | 16 | 16 | 15 | 15 |
| $\sigma$100 (MPa) | 5.1 | 6.2 | 6.7 | 7.1 |
| $\sigma$300 (MPa) | 12.1 | 13,2 | 13,6 | 13.7 |
| Tensile strength (MPa) | 14.9 | 14.7 | 14.3 | 13.9 |
| Elongation at break (%) | 430 | 390 | 340 | 320 |

EXAMPLE 4

Demonstrates the cross-linking of epichlorohydrin rubber with BDTD by comparison with lead oxide and ethylene thiourea. With the doses used here, a somewhat more favourable initial vulcanization time combined with a substantially higher degree of cross-linking (see Hardness, o, Elongation at break) is achieved with BDTD.

| (Example 2) | E | F |
|---|---|---|
| Epichlorohydrin elastomer | 60 | 60 |
| Epichlorohydrin/ethylene oxide copolymer | 40 | 40 |
| 2-Mercapto-benzimidazole | 1 | 1 |
| Nickel dibutyl dithiocarbamate (80%) | 1.5 | 1.5 |
| Carbon black N-330 | 15 | 15 |
| Carbon black N-550 | 25 | 25 |
| Barium carbonate (80%) | 4 | — |
| Urea activator | 2 | |

-continued

| (Example 2) | E | F |
|---|---|---|
| Ethylene thiourea (70%) | — | 1.5 |
| Red lead (70%) | — | 6 |
| BDTD | 2.5 | — |
| Initial vulcanization at 120° C. | | |
| t$_5$ (min) | 5.4 | 4.4 |
| T$_{35}$ (min) | 7.5 | 6.3 |
| Vulcanization 20 min/180° C. | | |
| Hardness (ShA) | 71 | 67 |
| Elasticity (%) | 25 | 23 |
| $\sigma$100 (MPa) | 6.1 | 3.5 |
| Tensile strength (MPa) | 10.2 | 13.9 |
| Elongation at break (%) | 155 | 335 |
| Compression set | 24 | 22 |

EXAMPLE 5

Demonstrates a comparison of the cross-linking of CM with peroxide and with BDTD. The higher tear propagation resistance and improved elongation at break obtained when cross-linking is carried out with BDTD are particularly noteworthy.

| (Example 3) | G | H |
|---|---|---|
| CM (chlorinate polyethylene) | 100 | 100 |
| Magnesium oxide | 10 | 10 |
| Carbon black N-330 | 60 | 60 |
| Ester plasticizer | 30 | 30 |
| Age resistor | 0.3 | 0.3 |
| Amide-amine activator | 5.5 | — |
| BDTD | 2.5 | — |
| Bis-(t-butyl-peroxy-isopropyl)benzene | — | 7 |
| Triallyl cyanurate | — | 2.5 |
| Vulcanization 15 min/170° C. | | |
| Hardness (ShA) | 74 | 71 |
| Elasticity (%) | 23 | 24 |
| Tear propagation resistance (N/mm) | | |
| $\sigma$100 (MPa) | 5.1 | 4.8 |
| $\sigma$300 (MPa) | 15.2 | 17.3 |
| Tensile strength (MPa) | 16.8 | 17.9 |
| Elongation at break (%) | 365 | 320 |
| Compression set (%) | | |
| 24 h/125° C. | 12 | 11 |
| 24 h/150° C. | 29 | 32 |

EXAMPLE 4

Demonstrates that BDTD is very suitable for cross-linking chlorine-containing elastomers. The use of DMTD and BMTD for such vulcanization is already known, as mentioned above. An intermediate position between these two cross-linking agents is obtained with BDTD. Thus the initial vulcanization time is longer with BDTD than with BMTD but shorter than with DMTD.

DMTD = dimercaptothiadiazole

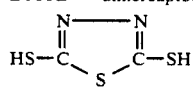

BMTD = monobenzoyl dimercaptothiadiazole

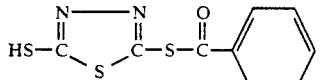

BDTD = dimeric dimercaptothiadiazole

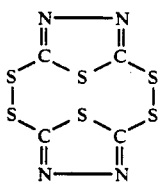

| (Example 4) | I | K | L |
|---|---|---|---|
| CM | 100 | | |
| MgO | 10 | | |
| Carbon black N-550 | 70 | | |
| Aromatic mineral oil | 30 | | |
| Alkyl sulphonic acid ester | 10 | | |
| Amidamine | 3.5 | | |
| DMTD | 2.0 | — | — |
| BMTD | — | 2.0 | — |
| BDTD | — | — | 2.0 |
| Vulcanization at 180° C. | | | |
| ti (min) | 5.3 | 2.6 | 3.8 |
| F 10 (dNm) | 30.0 | 31.5 | 28.3 |
| F 24 (dNm) | 49.0 | 37.0 | 43.5 |
| Vulcanization 20 min/170° C. | | | |
| Hardness (ShA) | 77 | 79 | 82 |
| Elasticity (%) | 16 | 14 | 15 |
| σ100 (MPa) | 8.1 | 5.4 | 6.7 |
| σ300 (MPa) | 14.0 | 12.7 | 13.6 |
| Tensile strength (MPa) | 14.9 | 14.5 | 14.3 |
| Elongation at break (%) | 305 | 400 | 340 |
| Compression set | | | |
| 24 h/100° C. (%) | 10 | 9 | 11 |
| 24 h/125° C. (%) | 16 | 15 | 13 |

I claim:

1. Process for the cross-linking of a halogenated polymer selected from the group consisting of chlorinated polyethylene, epichlorohydrine rubber and epichlorohydrine ethylene oxide copolymer, wherein the polymer is subjected to the action of bis-(2,5-dithio-1,3,4-thiadiazole) or derivatives thereof in the presence of a basic material consisting of an amidamine corresponding to the following formula $$R-CO-NH-[CH_2-CH_2-NH-]_n-CO-CO-R_1 \quad (I)$$

wherein

R denotes a saturated or unsaturated hydrocarbon group having 6 to 22 C-atoms, $R_1$ denotes alkyl, aryl, cycloalkyl, aralkyl or R—COCH$_2$CH$_2$ and n denotes an integer from 1 to 10.

2. The process of claim 1, wherein $R_1$ is an alkyl group having 1 to 18 carbon atoms.

3. The process of claim 2, wherein said alkyl group is straight chained.

4. The process of claim 2, wherein said alkyl group is branched.

5. The process of claim 1, wherein $R_1$ is an aryl group having 6 to 12 carbon atoms.

6. The process of claim 5, wherein said aryl group contains at least one substituent selected from the group consisting of halogen, $C_1$–$C_4$-alkyl, nitro, cyano and $C_1$–$C_4$-alkoxy.

7. The process of claim 1, wherein $R_1$ is a cycloalkyl group having 5 to 8 carbon atoms.

8. The process of claim 1, wherein $R_1$ is an aralkyl group having 7 to 12 carbon atoms.

9. The process of claim 8, wherein said aralkyl group comprises an aryl moiety containing at least one substituent selected from the group consisting of halogen, $C_1$–$C_4$-alkyl, nitro cyano and $C_1$–$C_4$-alkoxy.

10. The process of claim 1, wherein said amidamine corresponds to the following formula $$R_2\text{-CO}-NH-[CH_2\cdot CH_2-NH]_m-CO-R_3 \quad (II)$$

wherein $R_2$ is a straight chained, saturated alkyl with 8 to 18 carbon atoms, $R_3$ is a straight chained, saturated alkyl with 8 to 18 carbon atoms, and m is an integer from 2 to 5.

11. The process of claim 10, wherein $R_2$ and $R_3$ are identical.

12. The process of claim 10, wherein $R_2$ and $R_3$ are different.

13. The process of claim 1, wherein the amidamine is used in a quantity of from 1 to 5 percent by weight, based on the weight of the polymer.

14. The process of claim 13, wherein the amidamine is used in a quantity of from 2 to 4.5 percent by weight.

15. The process of claim 1, wherein the bis-(2,5-dithio-1,3,4-thiadiazole) or derivatives thereof is used in a quantity of from 1 to 4 percent by weight, based on the weight of the polymer.

16. The process of claim 15, wherein the bis-(2,5-dithio-1,3,4-thiadiazole) or derivatives thereof is used in a quantity of from 2 to 3 percent by weight.

* * * * *